United States Patent

Varreng et al.

[11] Patent Number: 5,908,332
[45] Date of Patent: Jun. 1, 1999

[54] CABLE TERMINATION

[75] Inventors: Jan Sverre Varreng, Oslo, Norway; Jean Becker, Sart-Eustache, Belgium; Shotu Chatterjee, Wemmel, Belgium; Jules Cabaux, Nivelles, Belgium

[73] Assignee: Alcatel Cable, France

[21] Appl. No.: 08/737,546

[22] PCT Filed: Sep. 21, 1995

[86] PCT No.: PCT/EP95/03710

§ 371 Date: Dec. 16, 1996

§ 102(e) Date: Dec. 16, 1996

[87] PCT Pub. No.: WO96/10851

PCT Pub. Date: Apr. 11, 1996

[30] Foreign Application Priority Data

Sep. 30, 1994 [NO] Norway ................................ 943638

[51] Int. Cl.[6] ........................................................ H01R 9/03
[52] U.S. Cl. ........................................... 439/610; 439/921
[58] Field of Search ................................ 439/181–187, 439/610, 921

[56] References Cited

U.S. PATENT DOCUMENTS 3,401,370  9/1968  Weinfurt et al. ........................... 339/91
4,946,393  8/1990  Borgstrom et al. ...................... 439/921

FOREIGN PATENT DOCUMENTS

| 7816763 | 1/1979 | France . |
| 3027096 | 2/1982 | Germany . |
| 3211119 | 10/1983 | Germany . |
| 8436201 U | 5/1986 | Germany . |
| 8502491 U | 8/1986 | Germany . |

*Primary Examiner*—Gary Paumen
*Attorney, Agent, or Firm*—Ware, Fressola, Van der Sluys & Adolphson LLP

[57] ABSTRACT

The present invention aims to obtain a simplified connection system for high voltage power cables having ratings up to 400 KV and above. There is obtained a common cable connection system for all accessories and interconnection. The connection system uses a generally applicable interface (4, 5, 6; 13, 14, 15; 30, 40) for interconnection with a number of different apparatus and includes a cable termination (30) consisting of an elastomeric body (36), integrated therein a stress relief device (34), a connector shield (35), an insulation having a conical interface surface (37) and an outer conductive screen (39) and a rigid insulator (41) having a conical interface surface (42) corresponding to the interface surface (37) of the cable termination (30).

16 Claims, 5 Drawing Sheets

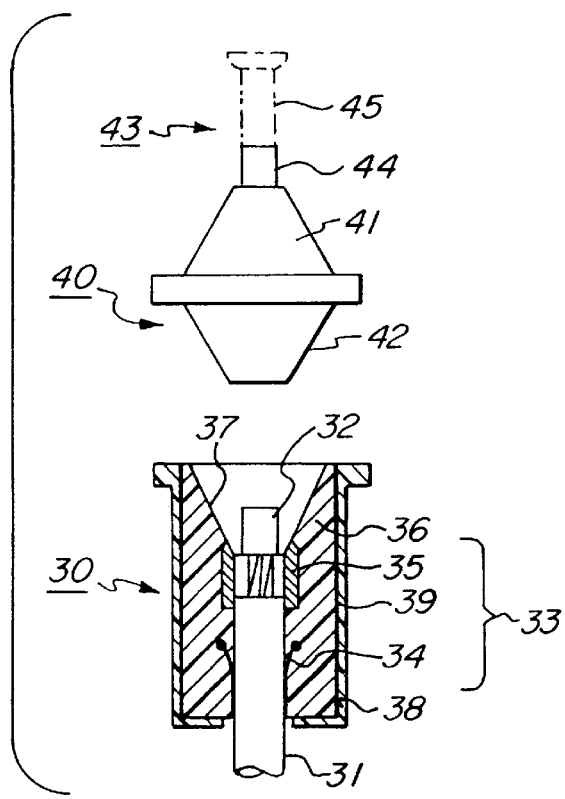
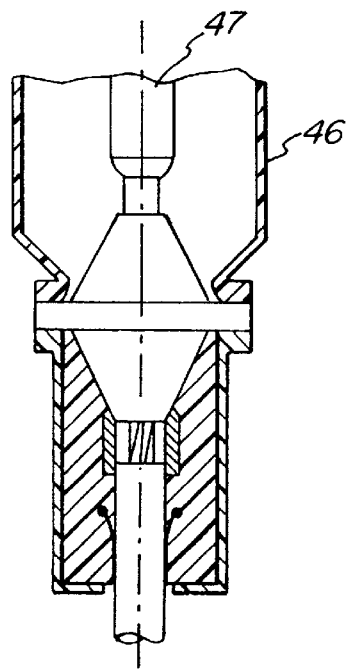
FIG. 4   FIG. 5
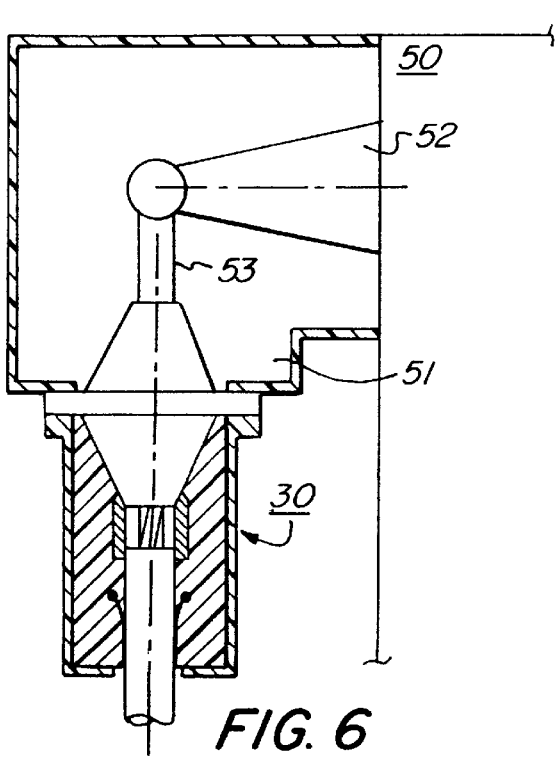
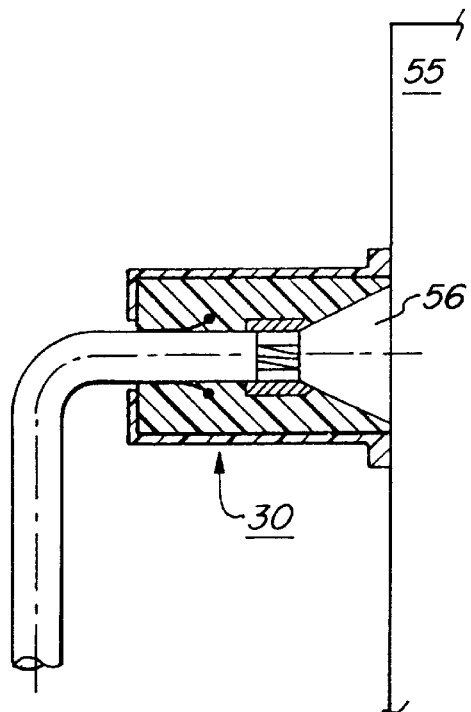
FIG. 6   FIG. 7

CABLE TERMINATION

BACKGROUND OF THE INVENTION

1. Technical Field

The present invention relates to a device for interconnecting a high voltage cable with an apparatus and/or with a second high voltage cable consisting of a cable termination and a rigid insulator.

2. Description of the Prior Art

When connecting such high voltage power cables in normal joints, in transition joints, to transformers and other SF6 and oil filled apparatus and accessories and out-door terminals, the interfaces are usually different for each application.

SUMMARY OF THE INVENTION

Therefore, the object of the present invention is to provide a simplified connection system for the above cables having ratings up to 400 KV and above. The features of the invention are defined in the accompanying patent claims.

With the present invention there is obtained a common cable connection system for all accessories and interconnections. The interface between the cable end and any accessory, between two cable ends or between two apparatus is generally applicable, resulting in a number of advantages, such as factory pretesting, reduction of installation time and cost, reduction of tools and simplified field testing.

The stress cone design and dimensions would also be the same for all applications, the only variation being the diameter of the cable or apparatus entrance.

A further advantage is that the interface components does not include any gas or oil and, therefore, they cannot leak or explode.

Above mentioned and other features and objects of the present invention will clearly appear from the following detailed description of embodiments of the invention taken in conjunction with the drawings.

BRIEF DESCRIPTION OF THE DRAWINGS

FIGS. 4 to 12 illustrate several applications of the invention.

DETAILED DESCRIPTION OF THE INVENTION

Figure 1:
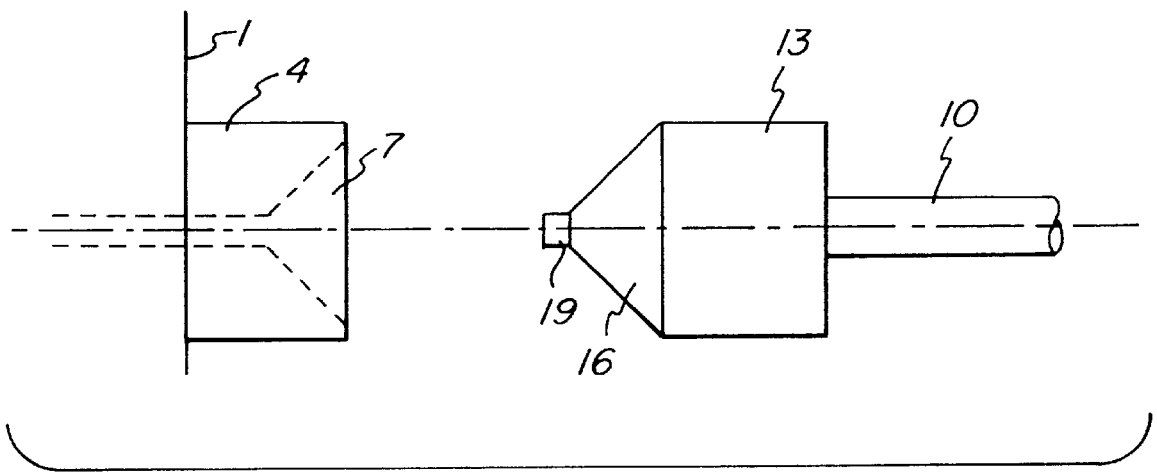
FIGS. 1 to 3 illustrate three different principles of interface between a cable end and accessories.
Figure 2:
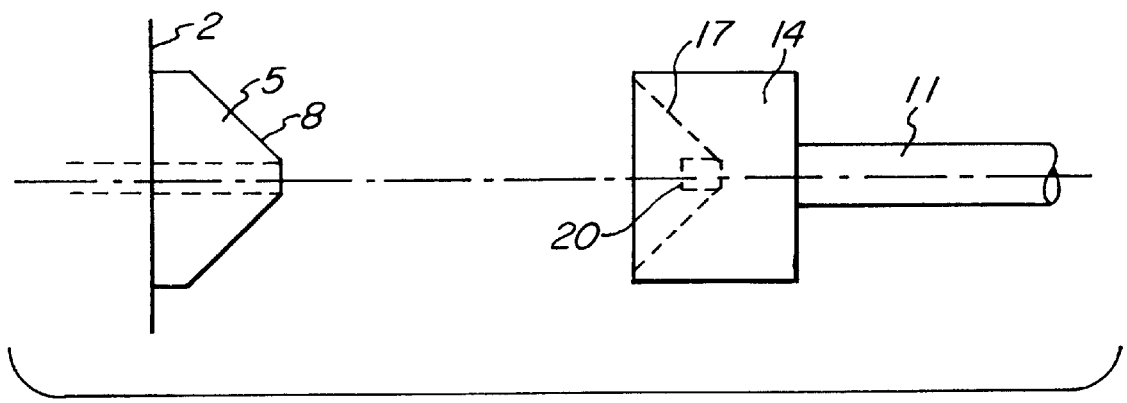
Figure 3:
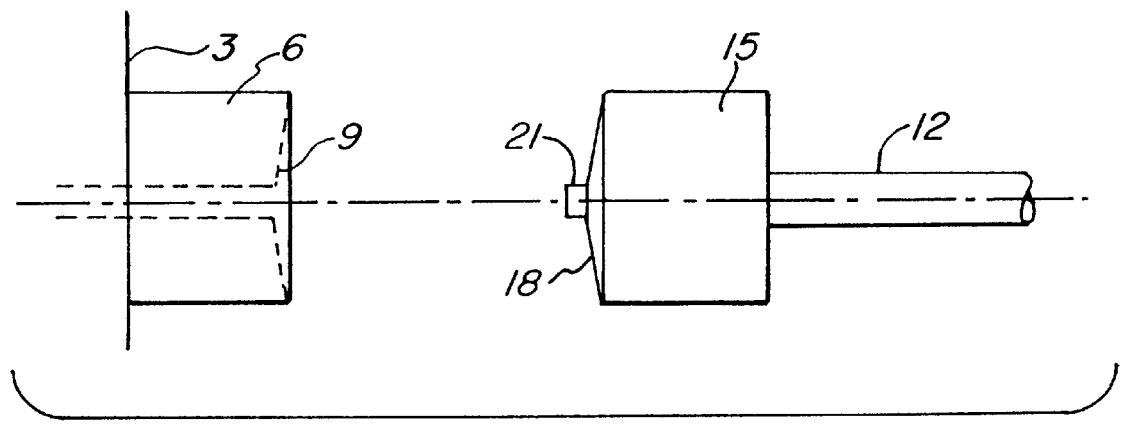

In FIGS. 1, 2 and 3, there are illustrated three interface methods,—respectively called an inner cone concept, an outer cone concept and a no cone or slight inner cone concept. The type of cone concept refers to the shape of the connector on the apparatus side. In all three figures an apparatus or accessory 1, 2 and 3 respectively, are indicated to the left. Connectors 4, 5 and 6 are respectively provided with an inner cone 7, an outer cone 8 and a slight inner cone 9. The interface could also be obtained by using plane contacting surfaces.

To the right in FIGS. 1 to 3 are illustrated three cables 10, 11 and 12, respectively provided with terminations 13, 14 and 15 having end surfaces 16, 17 and 18 fitting the corresponding coned surfaces 7, 8 and 9. The conductor joints (plug-in, welding, clamping etc) are not part of the present invention and will not be described here. We have only indicated cable connectors 19, 20 and 21 on the cable terminations 13, 14 and 15 respectively.

In the following detailed description of examples of cable connections we have chosen to show the outer cone concept, it being understood however, that the same series of interconnections can be obtained with the inner cone concept and with the slight inner cone (or plane) concept.

A general advantage of the outer cone concept over the inner cone is that the outer cone separates the cable connection further from the apparatus it is connected to, than does the inner cone. Hence a fault at one side is less likely to affect the other side.

The inner cone concept would have the advantage that a shorter solution could be used outside an SF6 cubicle. Problems with the coned surfaces may arise when components are made by different suppliers. The apparatus connectors are usually made of epoxy or similar non-compressible, rigid material, whereas the cable terminations usually are made of rubber and similar compressible or elastomeric materials. The outer cone concept would have the advantage over the inner cone concept that it is easier to expand the rubber material than to compress it.

An advantage of the substantially plane surface interconnection is that this simplifies complete alignment of the meeting surfaces without risking glow discharges.

FIGS. 4 and 5 illustrate the components of an SF6 terminal using the outer cone concept and the present invention. As will be seen from the succeeding drawings, the concept of the cable termination illustrated in FIG. 4 is the generally applicable building block of all applications.

A cable termination 30 shown in the lower part of FIG. 4 is arranged on a cable end 31 provided with a cable connector 32 and a stress relief cone 33 comprising a voltage deflector 34 as a stress relief device and a connector shield 35 embedded within a body 36 of elastomeric insulation. The body 36 of elastomeric insulation is covered by a conductive screen 39 and is enclosed within an outer rigid casing 38.

The termination 30 fits to an interface device 40 including a rigid insulating body 41, e.g. made of an epoxy resin, having a conical interface surface 42 which fits to the interface surface 37 of the elastomeric body 36 of the termination 30.

When the interface device 40 is used in connection with an SF6 terminal, the rigid insulator 41 is provided with a connector 43 which may have a compact version 44 or an IEC 859 standard (longer) version 45.

In FIG. 5, an SF6 termination of the present invention is illustrated. In addition to the components 30, 40 and 43, the drawing indicates an SF6 casing 46 and a connector 47. The usual hollow insulator used in conventional terminations is replaced by the compact or rigid epoxy body 41 around the conductor.

Advantages over conventional terminals are: Compact design, lower material and installation cost, complete independence between gas insulated switch gear and cable installations, standardization.

In FIGS. 6 and 7, there are illustrated two versions of transformer terminals. FIG. 6 shows an application of the invention with a transformer 50 having an oil-filled box 51 with a bushing 52 to which a cable termination 30 and connector 53 are connected. The connector 53 corresponds to the parts 40 and 43 in FIG. 4.

In FIG. 7, a transformer 55 is provided with bushing 56 comprising the rigid insulating body 41 with the interface surface 42 which is connected directly to a cable termination 30, having the corresponding interface surface 37 as indicated in FIG. 4. This transformer terminal version is useful with the outer cone concept only. This version implies enhanced safety due to the omission of the oil-filled box with its highly combustible oil.

Figure 8:
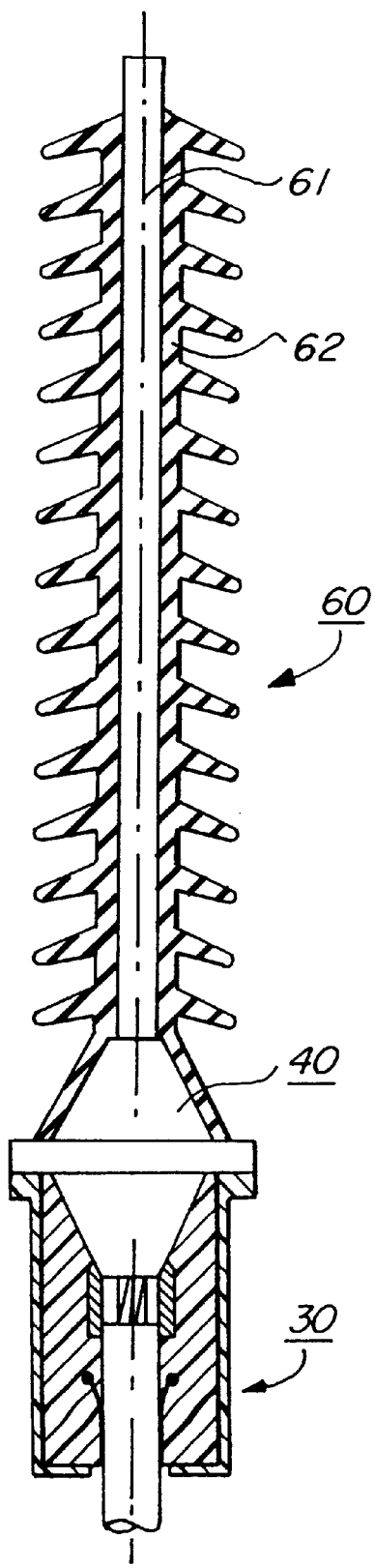
Figure 9:
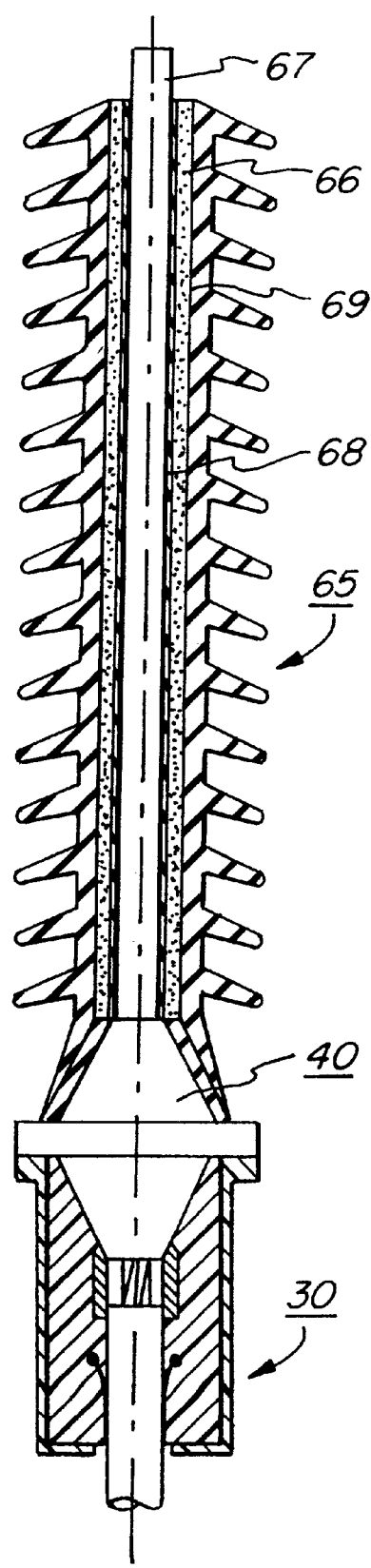

In FIGS. 8 and 9, there are shown two versions of out-door terminals. In FIG. 8, the terminal 60 consists of components 30 and 40 combined with a conductor 61 which together with the epoxy insulator 40 is covered by tracking resistant EPDM rubber or silicone rubber sheath 62. This design eliminates the need for an oil- or SF6 -filled insulator, while maintaining the mechanical rigidity of the omitted insulator.

In FIG. 9, the out-door terminal 65 includes a surge suppressor device 66. This terminal is in principle similar to that described in U.S. Pat. No. 5,206,780 (J Varreng 6). The device 66, which consists of non-linear material such as ZnO or SiC, is separated from the conductor 67 by a layer of insulation material 68. The interconnections from the non-linear material layer, at the bottom to ground and at the top to the conductor 67 are not shown. The device 66 may be a continuous tube or it may consist of a number of series connected annular elements. The device 66 and insulator 40 are covered with tracking resistant EPDM rubber or silicone rubber sheath 69 as in FIG. 8.

Figure 10:
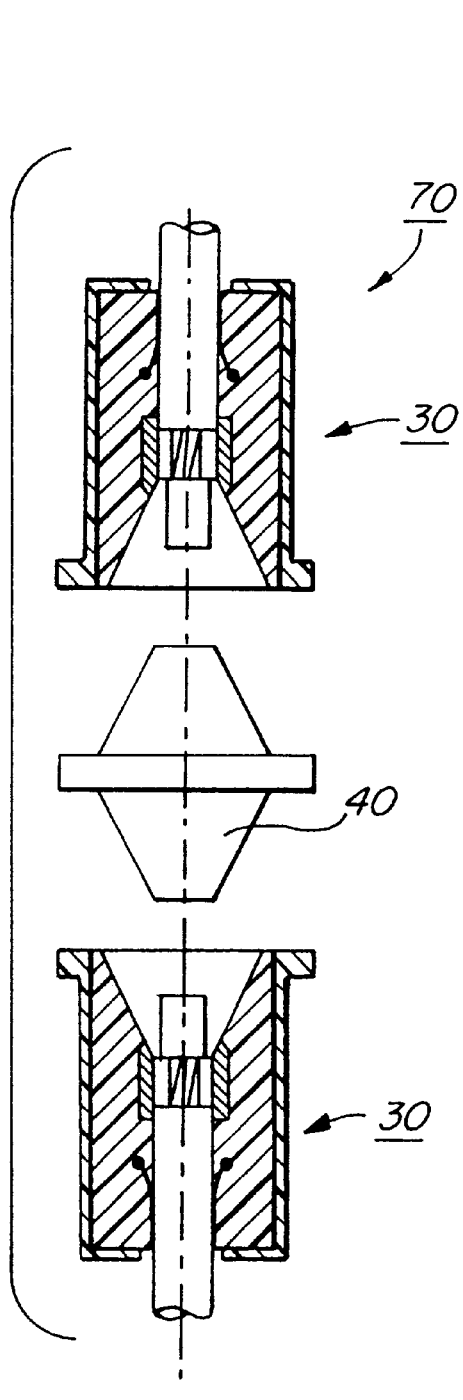

FIG. 10 illustrates a straight through joint 70. The epoxy component 40 is shaped as a symmetrical double cone which forms a center piece of a plug-in joint joining two cable terminations 30. This design may be more expensive than a pure elastomeric joint, but it has the advantage of factory testing and quick installation.

Figure 11:
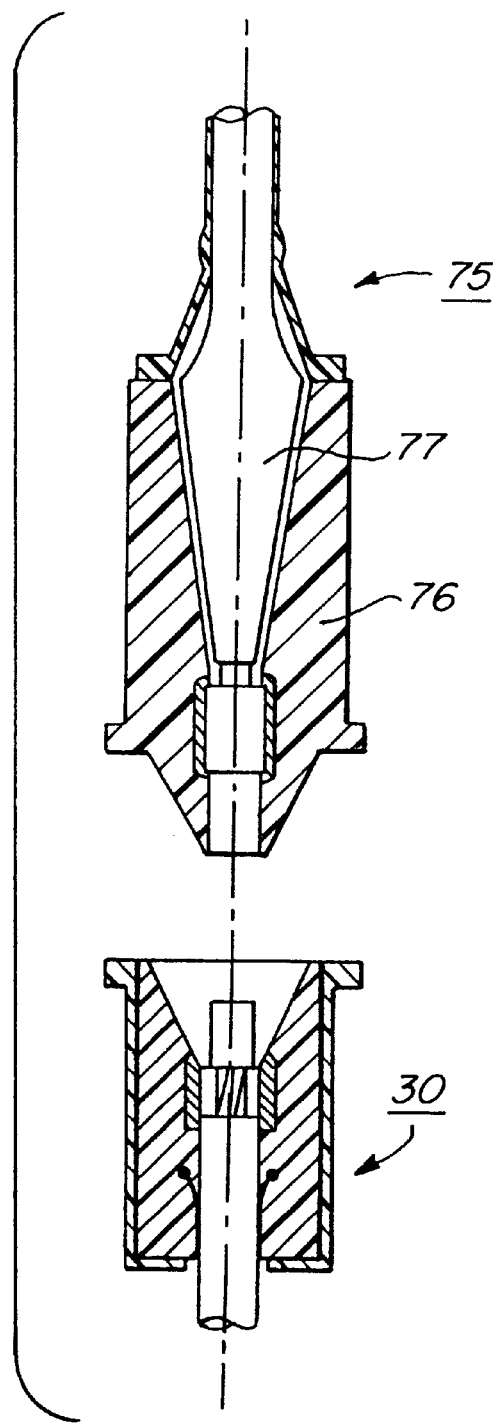

FIG. 11 illustrates a transition joint 75 between a dry cable and an oil-filled cable. The epoxy component may be extended to form an insulator housing 76 on the oil-filled side 77. Advantages are as above,—lower material and installation cost as well as a compact design.

Figure 12:
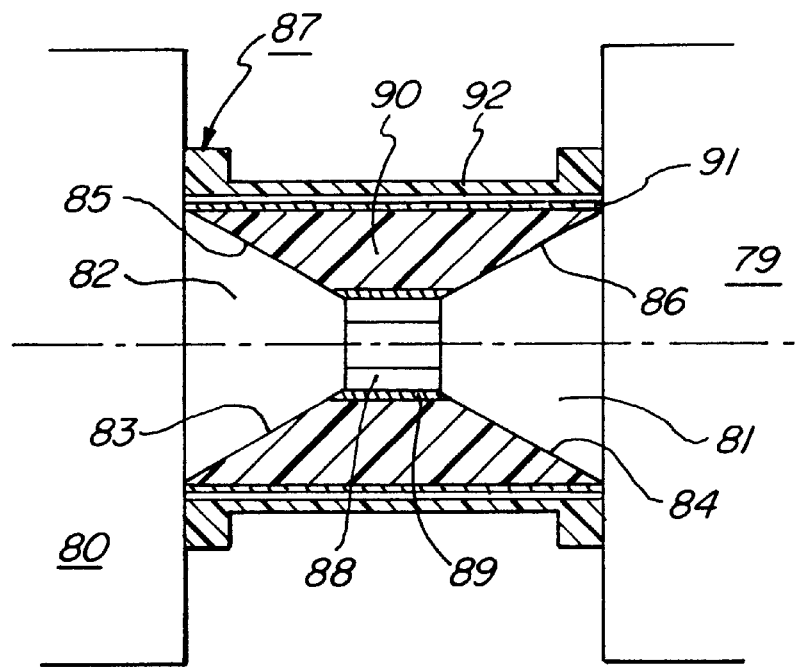

In FIG. 12, there is illustrated a joint 78 between two apparatus 79 and 80, e.g. between a transformer and a switching station. Rigid insulators 81 and 82 fastened to the apparatus, e.g., as bushing devices, have conical interface surfaces 83 and 84 corresponding to the interface surfaces 85 and 86 of the connection device 87. This device consists of a connector 88 for electrical conductors, not shown in this Figure, a connector shield 89, an insulating body 90 made of an elastomeric material and covered by a conductive screen 91. This complete device is enclosed within an outer rigid casing 92.

Figure 13:
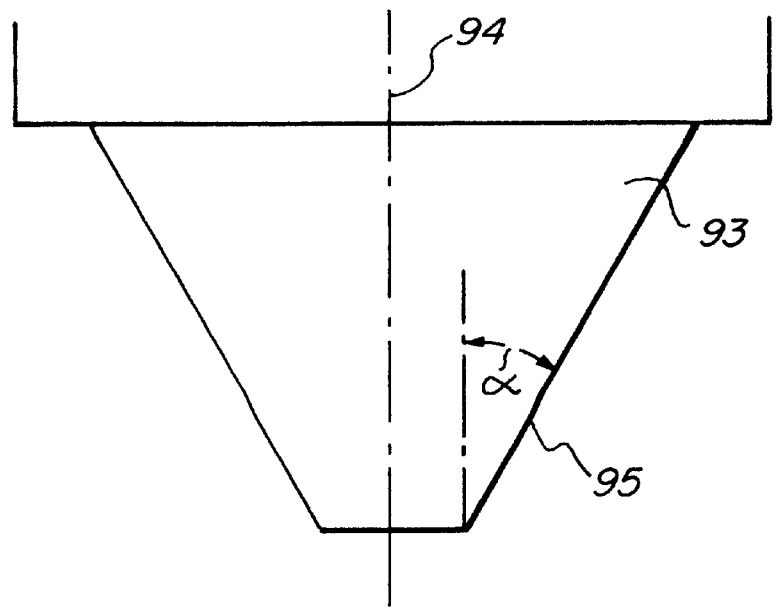
FIG. 13 illustrates a rigid insulator corresponding to the insulator shown in FIG. 4.

For optimizing the products described in the above detailed description and for making sure their high operating reliability in high or extra high voltage installations an essential characteristic is the outer surface configuration of the rigid insulator having the conical interface surface. Therefore, FIG. 13 illustrates a rigid insulator 93, corresponding to the insulator 41 in FIG. 4, to be used in the above embodiments of this invention. The claimed angle is the angle between the longitudinal axis 94 and the boundary surface 95 of the insulator 93. This angle defining the cone of the insulating body should be between 15° and 45°.

The above detailed description of embodiments of this invention must be taken as examples only and should not be considered as limitations on the scope of protection.

What is claimed is:

1. Device for interconnecting a high voltage cable with an apparatus or another high voltage cable, which comprises:

(a) a cable termination having an elastomeric body with a stress relief device and a connector shield integrated therein, the elastomeric body having a conical interface surface and an outer conductive screen the elastermeric body and the outer conductive screen being enclosed within an outer rigid casing; and (b) a rigid insulator having a conical interface surface corresponding to and adapted to mate with the interface surface of the cable termination.

2. Device according to claim 1, wherein the rigid insulator is made of an epoxy resin.

3. Device according to claim 1, wherein the rigid insulator is made of a polyurethane.

4. Device according to claim 1, wherein the interface surface of the elastomeric body is an outwardly extending conical surface adapted to fit an inwardly extending conical recess of the rigid insulator forming the conical interface surface thereof.

5. Device according to claim 1, wherein the interface surface of the elastomeric body is an inwardly extending recess adapted to fit an outwardly extending conical surface of the rigid insulator forming the conical interface surface thereof.

6. Device according to claim 1, the conical interface surface of the rigid insulator is defined by an angle in a range of from 15° to 45°.

7. Device according to claim 1, wherein the rigid insulator is fitted to an SF6 terminal.

8. Device according to claim 1, wherein the rigid insulator is fitted to a transformer terminal.

9. Device according to claim 1, wherein the rigid insulator forms a part of an outdoor terminal.

10. Device according to claim 1, wherein the rigid insulator forms a part of an outdoor terminal including a surge suppressor.

11. Device according to claim 1, wherein the rigid insulator forms a part of a straight through joint.

12. Device according to claim 1, wherein the rigid insulator forms a part of an oil-filled transition joint.

13. Device for interconnecting high voltage apparatus, which comprises:

(a) rigid insulators having conical interface surfaces and fastened to each apparatus being interconnected; and (b) an elastomeric body having a connector shield and an outer conductive screen integrated therewith, the elastomeric body and the outer conductive screen being enclosed within an outer rigid casing, the elastomeric body having conical interface surfaces corresponding to and adapted to mate with the conical interface surfaces of the rigid insulators.

14. Device according to claim 13, wherein the rigid insulator is made of an epoxy resin.

15. Device according to claim 13, wherein rigid insulator is made of a polyurethane.

16. A device for accomplishing electrical interconnection comprising:

(a) an elastomeric body and a connector shield integrated therein, the elastomeric body having a conical interface surface and an outer conductive screen the elastomeric body and the outer conductive screen being enclosed within an outer rigid casing; and (b) a rigid insulator having a conical interface surface corresponding to and adapted to mate with the interface surface of the elastomeric body.

* * * * *

UNITED STATES PATENT AND TRADEMARK OFFICE
CERTIFICATE OF CORRECTION

PATENT NO. : 5,908,332
DATED : June 1, 1999
INVENTOR(S) : Jan Sverre Varreng et al.

It is certified that error appears in the above-indentified patent and that said Letters Patent is hereby corrected as shown below:

In column 4, line 4 after "screen", --,-- should be inserted.

In column 4, line 4 "elastermeric" should be --elastomeric--.

In column 4, line 59 after "screen", --,-- should be inserted.

Signed and Sealed this

Ninth Day of November, 1999

Attest:

Q. TODD DICKINSON

Attesting Officer

Acting Commissioner of Patents and Trademarks